United States Patent
Lin et al.

(10) Patent No.: US 7,378,465 B2
(45) Date of Patent: May 27, 2008

(54) TIRE COMPONENTS HAVING IMPROVED MODULUS

(75) Inventors: Chenchy Jeffrey Lin, Hudson, OH (US); William Hergenrother, Akron, OH (US); Daniel Graves, Canal Fulton, OH (US); Georg G. A. Böhm, Canal Fulton, OH (US)

(73) Assignee: Bridgestone Corporation, 10-1, Kyobashi 1-Chome, Chuo-ku, Tokyo (JP)

(*) Notice: Subject to any disclaimer, the term of this patent is extended or adjusted under 35 U.S.C. 154(b) by 281 days.

(21) Appl. No.: 10/473,912

(22) PCT Filed: Apr. 4, 2002

(86) PCT No.: PCT/US02/10621

§ 371 (c)(1),
(2), (4) Date: Apr. 26, 2005

(87) PCT Pub. No.: WO02/081233

PCT Pub. Date: Oct. 17, 2002

(65) Prior Publication Data

US 2005/0228107 A1  Oct. 13, 2005

Related U.S. Application Data

(60) Provisional application No. 60/281,425, filed on Apr. 4, 2001, provisional application No. 60/281,427, filed on Apr. 4, 2001.

(51) Int. Cl.
*C08K 3/36* (2006.01)
*C08K 3/22* (2006.01)
*B60C 1/00* (2006.01)

(52) U.S. Cl. ............. 524/437; 524/504; 524/522; 524/525; 524/526; 524/556; 525/919; 152/209.1; 152/905

(58) Field of Classification Search ............ 524/522, 524/526, 437, 504, 525, 556; 525/919; 152/905, 152/209.1

See application file for complete search history.

(56) References Cited

U.S. PATENT DOCUMENTS

| | | | |
|---|---|---|---|
| 4,810,746 A | 3/1989 | Tsutsumi et al. | 524/522 |
| 5,238,997 A | 8/1993 | Bauer et al. | 525/66 |
| 5,962,593 A | 10/1999 | Hergenrother et al. | 525/274 |
| 6,251,977 B1* | 6/2001 | Georget et al. | 524/397 |
| 6,602,954 B1 | 8/2003 | Lin | 525/70 |

FOREIGN PATENT DOCUMENTS

| | | |
|---|---|---|
| EP | 0 675 162 | 10/1995 |
| EP | 0 704 481 | 4/1996 |
| EP | 1 008 464 | 6/2000 |
| GB | 2041945 | 9/1980 |

OTHER PUBLICATIONS

Rubber Technology, 3rd ed., Van Nostrand Reinhold, N.Y., 1987, pp. 20 and 46-50.*

Rubber Technology, 3rd ed., Van Nostrand Reinhold, N.Y., 1987, pp. 86-87.*

* cited by examiner

*Primary Examiner*—Fred Teskin
(74) *Attorney, Agent, or Firm*—Aruthur M. Reginelli; Meredith E. Hooker

(57) ABSTRACT

A tire component including a tire tread that comprises a vulcanized rubber, a rubber filler, and a modified rubber, where the modified rubber i) contains pendent or functional groups that contain carboxylic acid or anhydride groups, ii) has pendently grafted thereto a polymerized metal salt of an unsaturated carboxylic acid, or iii) contains both i and ii. The use of such modified rubbers in tire components advantageously increases the G' of such components.

29 Claims, 3 Drawing Sheets

TIRE COMPONENTS HAVING IMPROVED MODULUS

CROSS REFERENCE TO RELATED APPLICATION

This is a §371 application of PCT/US02/10621, which claims the benefit of U.S. application Ser. No. 60/281,425 filed on Apr. 4, 2001 and claims benefit of U.S. application Ser. No. 60/281,427 filed on Apr. 4, 2001; wherein these applications are expressly incorporated herein by reference.

FIELD OF THE INVENTION

This invention relates to rubber compositions and tire components that have increased dynamic moduli, as well as tire components having improved stable modulus at higher temperatures.

BACKGROUND OF THE INVENTION

Hysteresis loss and storage modulus are properties of rubber that have a significant impact on tire performance. Hysteresis loss can be defined by the formula tan $\delta = G''/G'$, where $G''$ is a measure of the dynamic loss modulus and $G'$ is the measure of storage modulus. Generally, as the temperature of a tire increase, $G'$ decreases. As a result, there may be a decrease in handling.

Inorganic fillers, such as silica, impart improved wet traction (as demonstrated by a high tan $\delta$ at 0° C.) and improved snow traction (as demonstrated by a low tan $\delta$ at −20° C.) when used as filler within tire treads. Mixing silica into a tire stock, however, is difficult because silica particles agglomerate and therefore they are not easily dispersed. In response, processing and dispersing aids are used during compounding. Unfortunately, the use of these processing and dispersing aids enhances the decrease in modulus that is typically observed at high temperatures.

Because inorganic fillers are technologically useful, there is a need to overcome the problems associated with the loss of $G'$ at elevated temperatures in tire treads containing inorganic fillers.

SUMMARY OF THE INVENTION

In general the present invention provides a tire component including a tire tread that comprises a vulcanized rubber, an inorganic filler, and a modified rubber, where the modified rubber i) contains pendent or functional groups that contain carboxylic acid or anhydride groups, ii) has pendently grafted thereto a polymerized metal salt of an unsaturated carboxylic acid, or iii) contains both i and ii.

The present invention also includes a tire tread comprising a vulcanized rubber, from about 10 to about 100 parts by weight inorganic filler per 100 parts by weight rubber, and from about 0.2 to about 10 parts by weight modified rubber per 100 parts by weight rubber.

The present invention also provides a tire component including a tire tread that comprises a vulcanized rubber, an inorganic filler, a modified polyolefin that contains pendent or terminal functional groups containing carboxylic acid or anhydride groups and a modified rubber that contains pendent or terminal functional groups containing carboxylic acid or anhydride groups.

The present invention also includes a tire component including a tire tread that comprises a vulcanized rubber, an inorganic filler, a modified rubber that contains a polymerized metal salt of an unsaturated carboxylic acid, and wherein the tire component is devoid of zinc oxide.

Additionally, the present invention also provides a tire prepared by a process comprising the steps of vulcanizing a rubber composition that has been prepared by compounding ingredients comprising i) a rubber, ii) an inorganic filler, iii) a modified rubber that contains pendent or terminal functional groups containing carboxylic acid or anhydride groups or a polymerized metal salt of an unsaturated carboxylic acid and iv) optionally a modified polyolefin that contains pendent or terminal functional groups containing carboxylic acid or anhydride groups.

The present invention also provides a tire component including a tire tread that comprises a vulcanized rubber, an inorganic filler, and a modified rubber, where the modified rubber is prepared by polymerizing i) an unsaturated carboxylic acid, ii) an unsaturated anhydride, iii) a metal salt of an unsaturated carboxylic acid or iv) combinations of i, ii or iii, to an elastomeric backbone via free-radical polymerization.

The addition of poly(metal carboxylate) grafted rubbers to tire formulations including inorganic fillers has surprisingly been found to stabilize the dynamic modulus of the tire rubber at high temperatures. Also, the use of these poly (metal carboxylate) grafted rubbers has surprisingly lead to an increased tan $\delta$ at higher temperature, as well as decreased tire wear in tires filled with inorganic filler.

This invention advantageously increases $G'$ of tire treads containing rubber fillers. Among other advantages, tire treads containing the modified rubbers of this invention also have improved dry traction. Another advantage of certain embodiments of this invention is the elimination of zinc oxide as an additive in tire rubber formulations.

DETAILED DESCRIPTION OF ILLUSTRATIVE EMBODIMENTS

Figure 1:
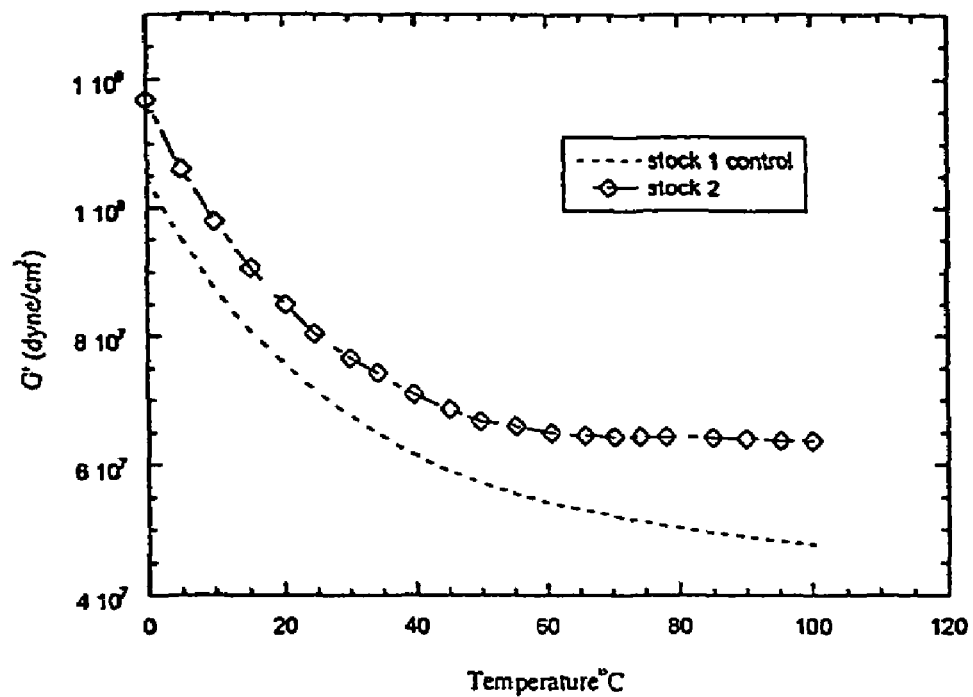
FIG. 1 is a graphical plot of the temperature dependence of $G'$ of a vulcanizate prepared according to the present invention as compared to a control.

Tires and tire components are prepared from rubber compositions that include a) a rubber, b) a modified rubber, wherein said modified rubber i) contains pendent or functional groups that contain carboxylic acid or anhydride groups, ii) contains pendently grafted thereto a polymerized metal salt of an unsaturated carboxylic acid, or iii) both i and ii, c) a inorganic filler, and d) an optional modified polyolefin that contains pendent or terminal functional groups that contain carboxylic acid or anhydride groups. Other additives that are typically employed in rubber compositions, especially those used to fabricate tires, may also be included.

Both synthetic and natural rubber may be employed within the rubber compositions. These rubbers, which may also be referred to as elastomers, include, without limitation, natural rubber, synthetic poly(isoprene), poly(styrene-co-butadiene), poly(butadiene), poly(styrene-co-butadiene-co-isoprene), poly(styrene-co-isoprene), and mixtures thereof.

In the first embodiment, the modified rubber additive is an elastomeric polymer that contains terminal or pendent functional groups that contain carboxylic acid or anhydride groups.

The terminal or pendent functional groups that contain the carboxylic acid or anhydride groups may be obtained by grafting functional groups to a polymeric chain or by preparing a copolymer by using at least one monomer that will yield the desired functional group The modified rubber additive can be obtained by polymerizing unsaturated carboxylic acids or unsaturated anhydrides from a graft point on an elastomeric polymer. For example, functional groups may be obtained by the free radical polymerization of methacrylic acid in the presence of the diene rubber. Examples of elastomers from which this grafting reaction may take place include poly(butadiene), poly(styrene-co-butadiene), poly(isoprene), poly(styrene-co-butadiene-co-isoprene), poly(styrene-co-isoprene), and terpolymers of ethylene, an a-olefin, and diene monomers. Examples of saturated carboxylic acids that can undergo polymerization and graft to an elastomer include citraconic acid, cinnamic acid, methacrylic acid, itaconic acid, and acrylic acid. Examples of unsaturated anhydrides that can undergo polymerization and graft to an elastomer include maleic anhydride, citraconic anhydride and itaconic anhydride.

Free radical polymerization is the preferred reaction for grafting these monomers to an elastomer. Preferably, this technique employs an initiator such as a thermo-decomposition initiator. Examples of these initiators include but are not limited to, di-sec-butyl peroxydicarbonate, t-amyl peroxy pivalate, 2,5-dimethyl-2,5-di-(2-ethylhexanoyl-peroxy) hexane, t-amylperoxy-2-ethylhexanoate, t-butyl-2-ethylhexanoate, 2,2-azo-bis-(2-methyl propionitrile), azo-bis-isobutyronitrile (AIBN) and the like. This grafting reaction preferably takes place in an inert solvent such as a hydrocarbon solvent.

Where the functional group is grafted to an elastomeric polymer to form the modified rubber additive, the resulting grafted copolymer may contain from about 1 to about 50 percent by weight, preferably from about 2 to about 35 percent by weight, and even more preferably from about 3 to about 25 percent by weight of the grafted functional groups.

Alternatively, the modified rubber can be obtained by copolymerizing unsaturated carboxylic acid monomers or unsaturated anhydride monomers with diene or other monomers that will provide a rubbery polymer. Examples of unsaturated carboxylic acids and unsaturated anhydrides are provided above. Examples of diene monomers that will yield a rubbery polymer include diene monomers such as 1,3-butadiene, and isoprene. Other monomer that may be copolymerized with these diene monomers include vinyl aromatic monomer such as styrene. This copolymerization technique is well-known, and it typically takes place in an emulsion polymerization with the use of a radical source such as a peroxide redox system.

The number average molecular weight of the modified rubber additive of this embodiment can vary greatly, although it is preferred that the number average molecular weight ($M_n$) be from about 200,000 to about 500,000.

The modified rubber additive of the first embodiment generally contains from about 0.02 to about 28 milliequivalents of functional groups (e.g., units deriving from methacrylic acid) per gram of modified polymer, preferably from about 0.1 to about 25, and more preferably from about 0.5 to about 20 milliequivalents of functional groups per gram of modified polymer.

The second embodiment of the present invention is the poly(metal carboxylate) graft rubber, which is a macromolecular structure that comprises an unsaturated hydrocarbon rubber backbone having pendently grafted thereto a polymerized metal salt of an unsaturated carboxylic acid. Each macromolecular structure will contain at least one pendent graft, preferably at least 2 pendent grafts, and more preferably at least 5 pendent grafts per mole of rubber polymer chain. This grafted rubber is described in U.S. Pat. No. 5,962,593, which is incorporated herein by reference.

Any unsaturated hydrocarbon rubber may be utilized to form the polymeric backbone of the graft copolymer rubber. Preferred unsaturated hydrocarbon rubbers include homopolymers of conjugated dienes and copolymers of conjugated dienes and other monomers such as vinyl aromatics. Exemplary conjugated diene monomers include 1,3-butadiene, isoprene, and 2,3-dimethyl-1,3-butadiene. Exemplary vinyl aromatic monomers include styrene, α-methylstyrene, and p-methylstyrene. Other preferred hydrocarbon rubbers include terpolymers of ethylene, propylene, and dienes such as, but not limited to, 5-ethylidene-2-norbornene and 1,4-hexadiene.

Some exemplary polymers include poly(butadiene), poly(styrene-co-butadiene), poly(ethylene-co-propylene-co-diene), poly(isoprene), poly(styrene-co-isoprene), and poly(butadiene-co-styrene-co-isoprene).

Any unsaturated carboxylic acid may be used to form the metal salt. The unsaturated carboxylic acids include α,β-ethylenically unsaturated carboxylic acids having from 3 to 8 carbon atoms. Exemplary carboxylic acids include acrylic, methacrylic, cinnamic, and crotonic acids, with acrylic and methacrylic acids being preferred. Suitable metal ions that may be used to form the metal salts include sodium, potassium, magnesium, calcium, zinc, barium, aluminum, tin, zirconium, lithium and cadmium, with zinc and magnesium being preferred. The metal ion is preferably introduced in the form of a salt of the carboxylic acid. A preferred metal salt is zinc dimethacrylate.

The poly(metal carboxylate) graft rubber can be prepared by (i) dissolving an unsaturated hydrocarbon rubber in a solvent, (ii) adding to the dissolved rubber a metal salt of an unsaturated carboxylic acid to form a rubber/carboxylic acid blend, (iii) adding to the rubber/carboxylic acid blend a free radical initiator, and (iv) heating the reaction mixture to a temperature of from about 40 to about 150° C. for about 0.1 to about 100 hours. Preferably, the reactor containing the rubber/carboxylic acid blend is sealed prior to adding the initiator. Once sealed, the initiator is preferably added in liquid form under pressure.

The metal salt is preferably added as a fine powder with stirring and under a nitrogen atmosphere to form a dispersion of the metal salt in the polymer solution. Preferably, a surfactant is added along with the metal salt in order to provide a more stable dispersion of the metal salt in the polymer solution. Preferred surfactants include nonionic octylphenoxy polyethoxy ethanol surfactants, which available as Triton X-15, Triton X-45, and Triton X-100 (Rohm and Haas Co.; Philadelphia, Pa.).

Preferably, any solvent in which both the rubber and the free radical initiator are soluble may be used. The preferred solvents are the hydrocarbon solvents in which the original polymers were prepared. Exemplary solvents are aromatic and aliphatic hydrocarbons including, but not limited to, hexane, heptane, pentane, octane, cyclohexane, cycloheptane, cyclopentane, methyl cyclohexane, benzene, and toluene. Hexane and toluene are preferred.

Suitable free radical initiators include, but are not limited to, di-sec-butyl peroxydicarbonate, t-amyl peroxy pivalate, 2,5-dimethyl-2,5-di-(2-ethylhexanoyl-peroxy) hexane, t-amylperoxy-2-ethylhexanoate, t-butyl-2-ethylhexanoate, 2,2-azo-bis-(2-methyl propionitrile), azo-bis-isobutyronitrile (AIBN) and the like.

The optional modified polyolefin additive includes an α-olefin polymer that contains terminal or pendent moieties containing acid or anhydride groups.

The terminal or pendent moieties typically derive from unsaturated carboxylic acids or unsaturated anhydrides. Examples of unsaturated carboxylic acids include citraconic acid, cinnamic acid, methacrylic acid, and itaconic acid. Examples of unsaturated anhydrides include maleic anhydride, citraconic anhydride, and itaconic anhydride. The preferred terminal or pendent moieties are succinic anhydride groups, or the corresponding acid from a ring opening structure, that derives from maleic anhydride.

The α-olefin polymer includes an α-olefin homopolymer, a copolymer of two or more α-olefins, or a copolymer of an α-olefin with a compatible monomer. The α-olefins can include from about 2 to about 8 carbon atoms, and more preferably from 3 to about 5 carbon atoms. Exemplary α-olefin monomers include ethylene, propylene, butene-1, and pentene-1. Exemplary monomers that can be copolymerized with α-olefins include vinyl aromatic monomers and diene monomers. An exemplary copolymer is poly (propylene-co-ethylene) that contains polyethylene crystals.

The modified polyolefins should contain from about 0.01 to about 3 pbw of the functional moiety based upon the weight of the entire polymer. More preferably, the modified polyolefin should contain from about 0.1 to about 2 pbw of the functional moiety, an even more preferably from about 0.15 to about 1.0 pbw of the functional moiety.

The number average molecular weight of the modified polyolefins can vary greatly, although it is preferred that the number average molecular weight ($M_n$) be from about 20,000 to about 500,000, more preferably from about 100,000 to about 400,000, and even more preferably from about 150,000 to about 400,000, as determined by using standard GPC analysis with polystyrene as a standard. Generally, the molecular weight distribution ($M_w/M_n$) should be less than about 4.5, preferably less than about 4.0, and even more preferably less than about 3.8.

The modified polyolefin additives are typically prepared by grafting unsaturated carboxylic acids or unsaturated anhydrides to a polyolefin polymer.

The techniques employed to attach the terminal or pendent moieties that contain carboxylic acid or anhydride groups to a polyolefin polymer are well known in the art. For example, grafting maleic anhydride to a polyolefin is disclosed in U.S. Pat. No. 6,046,279, which is incorporated herein by reference.

The α-olefin polymers can be synthesized by using a number of polymerization techniques such as, but not limited to, the "Phillips catalyzed reactions" conventional Ziegler-Natta type polymerizations, and metallocene catalysis including, but not limited to, metallocene-aluminoxane and metallocene-ionic activator catalysis.

Exemplary α-olefin polymers include polyethylene, polypropylene, poly(ethylene-co-propylene), poly(propylene-co-butene-1), and poly(butene-1-co-ethylene). These α-olefin polymers can be either amorphous, semi-crystalline, or crystalline polymers. The preferred polyolefins include crystalline or stereoregular polypropylene. Most polypropylene homopolymers that are commercially produced have an isotactic microstructure. The poly(propylene-co-ethylene) copolymers can be random or block copolymers. Preferably, these copolymers will contain some polyethylene crystals, although they should include a major amount of propylene units and only a minor amount of ethylene units. Preferably, these copolymers should contain less than about 40 percent by weight (pbw) ethylene units, more preferably from about 1 to about 30 pbw ethylene units, and more preferably from about 1.5 to about 25 pbw ethylene units.

Modified polyolefins are commercially available. For example, maleic anhydride functionalized polypropylene is available under the tradename EXXELOR™ P01015 & 1020 (Exxon Mobil Chemical Company; Houston, Tex.), under the tradename PP-C™, CA1000, or 18707 (Elf Atochem; Philadelphia, Pa.), or under the tradename Polybond™ 3001, 3002, or 3150 (Uniroyal Chemical Company; Middlebury, Conn.).

The rubber compositions preferably include an inorganic filler as well as optional organic fillers. The inorganic fillers may include silica, aluminum hydroxide, magnesium hydroxide, and clays (hydrated aluminum silicates). The optional organic fillers includes carbon black.

Useful silica (silicon dioxide) includes wet-process, hydrated silica produced by a chemical reaction in water, and precipitated as ultrafine spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 $m^2/g$, preferably about 100 to about 250 $m^2/g$, and more preferably about 150 to about 220 $m^2/g$. The pH of the silica filler is generally about 5.5 to about 7 and preferably about 5.5 to about 6.8. Commercially available silicas include Hi-Sil™ 215, Hi-Sil™ 233, and Hi-Sil™ 190 (PPG Industries; Pittsburgh, Pa.). Useful commercial grades of different silicas are also available from other sources including Rhone Poulenc.

Useful aluminum hydroxide fillers include any aluminum hydroxide filler including those that have conventionally been employed to reinforce rubber compositions and tire components.

Aluminum hydroxide filler preferably has an average diameter of about 20 nanometers (nm) to about 2,000 nm, more preferably from about 25 nm to about 1,000 nm or smaller, and even more preferably from about 30 nm to about 50 nm.

Useful aluminum hydroxide preferably has a BET specific surface area of from about 0.5 to about 500 $m^2/g$, more preferably from about 1 to about 400 $m^2/g$, and even more preferably from about 2 to about 300 $m^2/g$.

Aluminum hydroxide filler may be treated with various surface treating agents. Non-limiting examples of surface treating agents include organic treating agents such as fatty acids and alcohols, and inorganic dispersants such as coupling agents and fatty acid metal salts.

Useful aluminum hydroxide filler is commercially available from a number of sources including that available under the tradenames Hygilite™ (Showa Dendo K.K.; Japan), Baikalox™(Baikowski Chimie; France), and RF22™ (Sumitono Chemical Co.; Japan).

Useful carbon black may include any commonly available carbon black, but those having a surface area (EMSA) of at least 20 $m^2/g$, and more preferably at least 35 $m^2/g$ up to 200 $m^2/g$ or higher, are preferred. Surface area values used in this application are those determined by ASTM test D-1765 by using the cetyltrimethyl-amnmonium bromide (CTAB) technique.

A coupling agent may optionally be added when an inorganic filler such as silica is used. Coupling agents include those compounds that are believed to react with both the rubber and the inorganic filler. One coupling agent conventionally used is bis-[3(triethoxysilyl) propyl]-tetrasulfide, which is commercially available under the tradename SI69 (Degussa, Inc.; New York, N.Y.). Other coupling agents include bis-[3(tdethoxysilyl) propyl]-disulfide, which is commercially available under the tradename Silquest™ (Witco; Greenwich, Conn.), mercapto propyl alkoxy silane, which is commercially available under the tradename Ciptane™ (Dow Corning; Midland, Mich.), and dithio diproprionic acid or carboxylic acid disulfides, which are commercially available from Aldrich Chemical Company. In general, these coupling agents should be used in an amount from about 0.1 to 20% by weight based upon the weight of the inorganic filler.

Shielding and dispersing agents, which prevent or alleviate the agglomeration of inorganic filler particles such as silica, may also be used. Typically, these agents react or interact with the filler. Exemplary dispersing or shielding agents include silanes, amines, diols, polyethers, amides, and sugar fatty acid esters. U.S. Pat. Nos. 5,719,207, 5,780, 538, 5,717,022, and EP 0890606 are incorporated herein by reference in this regard. Specific examples of these agents include sugar, fatty acids such as sorbitan fatty acids which are available from BASF (Mount Olive, N.J.), and octyl triethoxy silane, which is available from Dow Corning (Midland, Mich.). Generally, these shielding or dispersing agents may be used in an amount from about 0.1 to about 20% by weight based on the weight of the inorganic filler. In preferred embodiments, the coupling agents, shielding agents, and dispersing agents may be used in combination.

The rubber compositions of this invention can be cured in a conventional manner with known vulcanizing agents. For example, sulfur or peroxide-based curing systems may be employed. Also, see Kirk-Othmer, ENCYCLOPEDIA OF CHEMICAL TECHNOLOGY, $3^{rd}$ Edition, Wiley Interscience, N.Y. 1982, Vol. 20, pp. 365-468, particularly VULCANIZATION AGENTS AND AUXILIARY MATERIALS pp. 390-402, or *Vulcanization* by A. Y. Coran, ENCYCLOPEDIA OF POLYMER SCIENCE AND ENGINEERING, $2^{nd}$ Edition, John Wiley & Sons, Inc., 1989, which are incorporated herein by reference. Vulcanizing agents may be used alone or in combination. This invention does not appreciably affect cure times. Typically, vulcanization is effected by heating the vulcanizable composition; e.g., it is heated to about 170° C. Cured or crosslinked polymers may be referred to as vulcanizates, which are generally three-dimensional polymeric networks that are thermoset. Depending on the degree of unsaturation of the modified rubber, it may become part of the crosslinked network comprising the vulcanizate. Alternatively, if the modified rubber is highly saturated, it will be dispersed within the crosslinked polymeric network. The other ingredients, such as the modified polyolefin and fillers, are generally dispersed throughout this thermoset network.

The rubber compositions and tire components may also include other compounding additives such as accelerators, oils, waxes, scorch inhibiting agents, and processing aids. Compositions containing synthetic rubbers typically include antidegradants, processing oils, zinc oxide, optional tackifying resins, optional reinforcing resins, optional fatty acids, optional peptizers, and optional scorch inhibiting agents. The use of the poly(metal carboxylate) graft rubber according to this invention can, advantageously, eliminate the need for ingredients such as zinc oxide and stearic acid. The use of the terminal or pendent functional groups that contain the carboxylic acid or anhydride groups with the modified polyolefin can also eliminate the need for ingredients such as zinc oxide. Accordingly, the rubber compositions of certain embodiments of this invention may be essentially devoid of zinc oxide and stearic acid, where essentially devoid refers to the absence of any amount that is conventionally required to impact compounding and curing.

The rubber compositions and tire components of the present invention will generally contain from about 0.1 to about 25 parts by weight of the modified rubber additive per 100 parts by weight rubber (phr). Preferably, the rubber compositions and tire components will contain from about 0.2 to about 20 parts by weight phr, even more preferably from about 0.5 to about 15 parts by weight phr, and still more preferably from about 1 to about 10 parts by weight phr of the modified rubber additive.

The rubber compositions and tire components of the present invention will optionally contain from about 0.1 to about 25 parts by weight of the modified polyolefin additive per 100 parts by weight rubber (phr). Preferably, the rubber compositions and tire components will contain from about 0.2 to about 20 parts by weight phr, even more preferably from about 0.5 to about 15 parts by weight phr, and still more preferably from about 1 to about 10 parts by weight phr of the modified polyolefin additive.

Fillers, such as carbon black, silica or aluminum hydroxide, are typically employed in an amount from about 1 to about 100 parts by weight phr, and preferably from about 20 to about 90 parts by weight phr, and more preferably from about 40 to about 80 parts by weight phr.

Silica may optionally be used in an amount from about 10 to about 100 parts by weight phr, preferably from about 15 to about 90 parts by weight phr, and more preferably from about 20 to about 80 parts by weight phr.

Carbon black may optionally be used in an amount from about 0.5 to about 80 parts by weight phr, preferably from about 1 to about 40 parts by weight phr, and more preferably from about 2 to about 30 parts by weight phr.

Optionally, aluminum hydroxide filler should be employed in an amount from about 1 to about 25 parts by weight phr, preferably from about 2 to about 20 parts by weight phr, and more preferably from about 5 to about 15 parts by weight phr.

In a preferred embodiment, aluminum hydroxide, silica, and carbon black are used in combination. In this embodiment, the silica:carbon black ratio is from about 1:10 to about 99:1, more preferably from about 1:5 to about 5:1, and even more preferably from about 1:3 to about 3:1. And, the silica:aluminum hydroxide ratio is from about 3:1 to about 30:1, more preferably from about 5:1 to about 20:1, and even more preferably from about 6:1 to about 15:1.

Those skilled in the art will be able to choose a useful amount of the other ingredients that may be employed in practicing the present invention. For example, it is generally known in the art of making tire components, such as treads, that sulfur is typically employed in an amount from about 0.5 to about 10 parts by weight phr, and preferably from about 1 to about 6 parts by weight phr. Oils are typically employed in an amount from about 1 to about 60 parts by weight phr, and preferably in an amount from about 1 to about 50 parts by weight phr. Zinc oxide is typically employed in an amount from about 0.5 to about 8, and preferably from about 1 to about 5 parts by weight phr, however, compositions which contain the poly(metal carboxylate) graft rubber according to this invention, or modified rubber having terminal or pendent functional groups that contain the carboxylic acid or anhydride groups and the modified polyolefin of the present invention may eliminate the need for ingredients such as zinc oxide and stearic acid.

Tire formulations are compounded by using mixing equipment and procedures conventionally employed in the art. Preferably, an initial masterbatch is prepared that includes the elastomer component and the reinforcing fillers, as well as other optional additives such as processing oil and antioxidants. The modified rubbers are preferably added during preparation of the initial masterbatch. Once this initial masterbatch is prepared, the vulcanizing agents are blended into the composition. Rubber compounding techniques and the additives employed therein are generally known as disclosed in *The Compounding and Vulcanization of Rubber*, by Stevens in RUBBER TECHNOLOGY SECOND EDITION (1973 Van Nostrand Reihold Company). The mixing conditions and procedures applicable to silica-filled tire formulations are also well known as described in U.S. Pat. Nos. 5,227,425, 5,719,207, 5,717,022, as well as EP 0890606, all of which are incorporated herein by reference. The composition can then be processed into tire components according to ordinary tire manufacturing techniques including standard rubber curing techniques. Tire components of this invention preferably include tire treads. The compositions, however, can also be used to form other elastomeric tire components such as subtreads, black sidewalls, body ply skims, bead fillers and the like. Pneumatic tires can be made according to U.S. Pat. Nos. 5,866,171; 5,876,527; 5,931,211; and 5,971,046, which are incorporated herein by reference.

Tire components of this invention preferably include tire treads. The composition can also be used to form other elastomeric tire components such as subtreads, sidewalls, body ply skims, bead fillers and the like. The use of polyolefin additives within tires treads that contain the modified rubbers of the present invention leads to both reduced hysteresis loss while improving handling performance without the need for other additives such as particulate nylons.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

EXAMPLES

Example 1

Stocks 1-2

Two tire stocks were prepared from the formulations in Table I by using the compounding protocol set forth in Table II within a 310 gram Brabender mixer set at 60 r.p.m.

TABLE I

| | Stock 1 | Stock 2 |
|---|---|---|
| Polybutadiene | 100 | 90 |
| Poly(butadiene-g-methacrylic acid) | 0 | 10 |
| Precipitated silica | 65.00 | 65.00 |
| Aromatic Process oil | 16.25 | 16.25 |
| Wax | 1.5 | 1.5 |
| Antioxidant [N-(1,3 dimethylbutyl)-N'-phenyl-p-phenylene-diamine] | 1.70 | 1.70 |

TABLE I-continued

| | Stock 1 | Stock 2 |
|---|---|---|
| Si69 | 6.5 | 6.5 |
| Sulfur | 2.85 | 2.85 |
| Steric acid | 2.00 | 2.00 |
| Accelerator [N-Cyclohexyl-2-benzothiazyl-sulfenamide] | 1.50 | 1.50 |
| Diphenyl Guanidine | 0.50 | 0.50 |
| Zinc oxide | 2.5 | 2.5 |

The polybutadiene was obtained under the tradename HD55™ (Firestone Polymers; Akron, Ohio). The poly(butadiene-g-methacrylic acid) was prepared by grafting unsaturated methacrylic acid to polybutadiene by using azobisisobutyronitrile (AIBN) as an initiator. This grafting took place in a hydrocarbon solvent at 60-80° C. with 10 parts by weight methacrylic acid per 100 parts by weight polybutadiene. The polybutadiene had a Mooney Viscosity ($ML_{1+4}$ at 100° C.) of 52 and a cis microstructure of about 33 weight percent. The poly(butadiene-g-methacrylic acid) had a Mooney Viscosity ($ML_{1+4}$ at 100° C.) of 56, a cis microstructure of about 33 weight percent, and contained about 10 weight percent units deriving from the methacrylic acid.

TABLE II

| Master Batch Stage | |
|---|---|
| Initial Temperature | 100° C. |
| 0 sec | charging polymers |
| 30 sec | charging silica and all pigments |
| 5 min | drop |
| Drop Temperature | 155° C. |
| Remill 1 Batch Stage | |
| Initial Temperature | 70° C. |
| 0 sec | charging remilled stock |
| 30 sec | charging Si69 |
| Drop Temperature | 155° C. |
| Final Batch Stage | |
| Initial Temperature | 90° C. |
| 0 sec | charging remilled stock |
| 30 sec | charging curing agent and accelerators |
| Drop Temperature | 105° C. |

The final stocks were sheeted and then subsequently molded at 171° C. for 15 minutes. The Mooney Viscosity, δ(ΔG'), and curing characteristics of the uncured stocks were evaluated. Cured samples of each stock were also evaluated for tensile mechanical properties at 25° C. Further, the dynamic viscoelastic properties of cured samples of each stock were also evaluated. The results of this analysis are set forth in Table III.

TABLE III

| | Stock No. | |
|---|---|---|
| | 1 | 2 |
| Uncured Analysis | | |
| Mooney Viscosity ($ML_{1+4}$ @ 100° C.) | 80.8 | 81.7 |
| $T_5$ Scorch @ 130° C. (sec) | 951 | 1,037 |
| $t_{S2}$ @ 171° C. (min) | 1.07 | 1.18 |
| $T_{90}$ @ 171° C. (min) | 6.82 | 6.77 |
| δ(ΔG') (kPa) | 2,062 | 1,106 |

TABLE III-continued

| | Stock No. | |
|---|---|---|
| | 1 | 2 |
| Tensile Properties | | |
| Modulus @ 50% (MPa)) | 1.63 | 1.79 |
| Modulus @ 300% (MPa) | 9.86 | 10.74 |
| Tensile Strength @ Break (MPa) | 10.90 | 12.64 |
| Elongation @ Break (%) | 314 | 333 |
| Toughness (MPa) | 14.82 | 17.97 |
| Viscoelastic Properties | | |
| Tan$\delta$ @ 0° C. (temperature sweep) | 0.1733 | 0.1612 |
| Tan$\delta$ @ 50° C. (temperature sweep) | 0.1245 | 0.1131 |
| $\Delta$G' (G'@.25%-G'@14.75%) @ 65° C. (strain sweep) (MPa) | 0.253 | 0.2414 |
| Tan$\delta$ @ 7% strain and 65° C. (strain sweep) | 0.1055 | 0.1026 |
| British Portable Skid Tester | 42 | 42 |
| Abrasion Resistance (%) | 100 | 111 |

The Mooney viscosity measurement was conducted at 130° C. by using a larger rotor, and was recorded as the torque when the rotor has rotated for 4 minutes. Each sample was preheated at 130° C. for one minute before the rotor started.

$T_5$ is the time required to increase 5 Mooney units during the Mooney-scorch measurement. This index is used to predict how fast the compound viscosity will rise during processing. $t_{S2}$ and $T_{90}$ are the times required for torque rises to 2% and 90% of the total torque increase during curing characterization experiments at 171° C. These measurements are typically used to predict how fast the viscosity build-up ($t_{S2}$) and the curing rate during the curing process. The G' of the uncured stocks was obtained from a strain sweep measurement by using an RPA2000 Rubber Process Analyzer (Alpha Technologies). These strain sweep experiments were conducted at 50° C. at a frequency of 0.1 Hz with strain sweeping from 0.25% to 1,000%. The difference in G' at strains of 0.25% and 1,000% were recorded as the $\Delta$G'. $\Delta$G' was also determined after the stocks were annealed at 171° C. for 15 minutes. $\delta(\Delta G')$, therefore, is the difference between $\Delta$G' before annealing and $\Delta$G' after annealing ($\Delta$G' after heat treatment-$\Delta$G' before heat treatment).

The tensile mechanical properties were measured by using the standard procedure described in ASTM-D 412 at 25° C. The tensile test specimens were round rings with a dimension of 1.27 mm in width and 1.905 mm in thickness. A specific gauge length of 25.4 mm was used for the tensile test.

Temperature sweep experiments were conducted with a frequency of 31.4 rad/sec by using 0.5% stain for temperatures ranging from −100° C. to −10° C., and 2% strain for temperatures ranging from −10° C. to 100° C. Payne effect ($\Delta$G') and tan$\delta$ at 7% strain were obtained from the strain sweep experiments. A frequency of 3.14 rad/sec was used for strain sweep experiments conducted at 65° C. with strain sweeps from 0.25% to 14.75%.

The wet traction of the rubber was evaluated by using the British Portable Skid Tester. The details of this test are described in ASTM E-303, Vol. 04.03. According to this test, a specimen is attached to the base of a pendulum arm, and the specimen contacts the opposing surface during a swing of the pendulum. The weighted pendulum head is free to move vertically on the pendulum arm so that the swing amplitude determines the friction of the rubber against the pavement surface. The lower the amplitude that the pendulum swings up after contacting the surface (recorded as a higher value on the scale of the tester), the higher friction of the rubber against the surface.

The wear resistance of the cured samples were evaluated by weighing the amount of wear according to the Lambourne test. The wearing index was obtained from the ratio of the weight loss of the control to that of the testing sample. Samples with higher wear indices have better wear resistance properties. Samples used for this Lambourne test are circular donuts with the following approximate dimensions: 22.86 mm and 48.26 mm for the inside and outside diameters, and 4.95 mm in thickness. The test specimens were place on an axil and run at a slip ratio of 25% against a driven abrasive surface.

Stocks 3-6

Four tire stocks were prepared from the formulations in Table IV by using the compounding protocol set forth in Table V within a 310 gram Brabender mixer set at 60 r.p.m.

TABLE IV

| | Stock 3 | Stock 4 | Stock 5 | Stock 6 |
|---|---|---|---|---|
| Polybutadiene | 90 | 90 | 100 | 90 |
| poly(butadiene-g-methacrylic acid) | 10 | 10 | 0 | 10 |
| Polypropylene | 0 | 10 | 0 | 00 |
| poly((propylene-co-ethylene)-g-maleic anhydride) | 0 | 0 | 10 | 10 |
| Precipitated silica | 65 | 65 | 65 | 65 |
| Aromatic Process oil | 16.25 | 16.25 | 16.25 | 16.25 |
| Wax | 1.5 | 1.5 | 1.5 | 1.5 |
| Antioxidant [N-(1,3 dimethylbutyl)-N'-phenyl-p-phenylene-diamine] | 0.95 | 0.95 | 0.95 | 0.95 |
| Si69 | 6.50 | 6.50 | 6.50 | 6.50 |
| Sulfur | 2.85 | 2.85 | 2.85 | 2.85 |
| Steric acid | 1.50 | 1.50 | 1.50 | 1.50 |
| Accelerator [N-Cyclohexyl-2-benzothiazyl-sulfenamide] | 1.50 | 1.50 | 1.50 | 1.50 |
| Diphenyl Guanidine | 0.5 | 0.5 | 0.5 | 0.5 |
| Zinc oxide | 2.5 | 2.5 | 2.5 | 2.5 |

The polybutadiene and poly(butadiene-g-methacrylic acid) were the same as those from Table I. This grafting took place under substantially the same conditions as used for Samples 1 and 2. The polypropylene was obtained under the tradename PP340™ (Aldrich) and was characterized by having a weight average molecular weight ($M_w$) of about 340,000, a melt temperature ($T_m$) of about 161° C., and a crystallinity of greater than about 75%. The poly((propylene-co-ethylene)-g-maleic acid) was obtained under the tradename Orevac™ 18707 (Elf Atochem) and was characterized by having a $M_w$ of about 360,000, a $T_m$ of about 120° C. and about 150° C., a crystallinity that was greater than about 75%, an ethylene content of about 21 weight percent, and contained about 0.48 weight percent of moieties deriving from maleic anhydride.

TABLE V

| Master Batch Stage | |
|---|---|
| Initial Temperature | 100° C. |
| 0 sec | charging polymers and polyolefin (if added) |
| 30 sec | charging silica and all pigments |
| 5 min | drop |
| Drop Temperature | 175° C. |

TABLE V-continued

| Remill 1 Batch Stage | |
|---|---|
| Initial Temperature | 70° C. |
| 0 sec | charging remilled stock |
| | charging rest of the silica |
| 30 sec | charging Si69 |
| Drop Temperature | 155° C. |
| Final Batch Stage | |
| Initial Temperature | 90° C. |
| 0 sec | charging remilled stock |
| 30 sec | charging curing agent and accelerators |
| Drop Temperature | 105° C. |

The final stocks were sheeted and then subsequently molded at 171° C. for 15 minutes. The Mooney Viscosity, δ(ΔG'), and curing characteristics of the uncured stocks were evaluated. Cured samples of each stock were also evaluated for tensile mechanical properties at 25° C. and after heat aging at 100° C. for 24 hours. Further, the dynamic viscoelastic properties of cured samples of each stock were also evaluated. The results of this analysis are set forth in Table VI.

TABLE VI

| | Stock No. | | | |
|---|---|---|---|---|
| | 3 | 4 | 5 | 6 |
| *Uncured Analysis* | | | | |
| Mooney Viscosity (ML$_{1+4}$ @ 100° C.) | 81.7 | 110.7 | 98.4 | 101.1 |
| T$_5$ Scorch @ 130° C. (min) | 1,037 | 874 | 926 | 930 |
| t$_{S2}$ @ 171° C. (min) | 1.18 | 1.37 | 1.27 | 1.23 |
| T$_{90}$ @ 171° C. (min) | 6.77 | 6.47 | 6.79 | 6.90 |
| Δ(ΔG') (kPa) | 1,106 | 3,224 | 1,622 | 987 |
| *Tensile Properties (ring-shaped samples)* | | | | |
| Modulus @ 50% (MPa) | 1.79 | 2.56 | 2.10 | 2.12 |
| Modulus @ 300% (MPa) | 10.74 | 13.56 | 11.09 | 11.16 |
| Tensile Strength @ Break (MPa) | 12.64 | 16.55 | 14.24 | 16.02 |
| Elongation @ Break (%) | 333 | 353 | 361 | 389 |
| Toughness (MPa) | 17.97 | 27.54 | 23.74 | 27.98 |
| *Tensile Properties (dumbbell-shaped samples)* | | | | |
| Modulus @ 50% (MPa) | 1.79 | 3.08 | 2.37 | 2.33 |
| Modulus @ 300% (MPa) | 7.52 | 11.75 | 9.43 | 9.25 |
| Tensile Strength @ Break (MPa) | 13.73 | 16.35 | 14.15 | 16.28 |
| Elongation @ Break (%) | 511 | 432 | 448 | 518 |
| Toughness (MPa) | 33.90 | 38.00 | 33.00 | 42.46 |
| *Viscoelastic Properties* | | | | |
| Tanδ @ 0° C. (temperature sweep) | 0.1612 | 0.1754 | 0.1744 | 0.1689 |
| Tanδ @ 50° C. (temperature sweep) | 0.1131 | 0.1255 | 0.1206 | 0.1217 |
| ΔG' (G'@.25%-G'@14.75%) @ 65° C. (strain sweep) (MPa) | 0.79 | 1.37 | 0.98 | 1.085 |
| Tanδ @ 7% strain and 65° C. (strain sweep) | 0.2414 | 0.476 | 0.3813 | 0.3762 |
| British Portable Skid Tester | 0.1026 | 0.1115 | 0.1106 | 0.1120 |
| Abrasion Resistance (%) | 100 | 100 | 109 | 110.4 |

TABLE VII

| | Stock No. | | | |
|---|---|---|---|---|
| | 3 | 4 | 5 | 6 |
| *Tensile Properties @ 25° C. (after thermal aging)* | | | | |
| Modulus @ 50% (MPa) | 2.37 | 3.61 | 2.85 | 2.79 |
| Tensile Strength @ Break (MPa) | 14.15 | 16.86 | 15.79 | 17.24 |
| Elongation @ Break (%) | 249 | 241 | 258 | 286 |
| Toughness (MPa) | 15.34 | 19.71 | 18.24 | 22.21 |
| *Tear Properties @ 100° C.* | | | | |
| Strength (MPa) | 1.84 | 1.70 | 1.98 | 2.22 |
| Elongation @ Break (%) | 284 | 192 | 290 | 320 |

Stocks 7-8

Two tire stocks were prepared from the formulations of Table VIII (expressed in parts by weight) by using the compounding protocol set forth in Table II within a 310 gram Brabender mixer set at 60 r.p.m.

TABLE VIII

| | Stock 7 | Stock 8 |
|---|---|---|
| Natural Rubber | 20.0 | 20.0 |
| Solution SBR | 50.0 | 50.0 |
| Poly(metal carboxylate) grafted rubber | 0.0 | 5.0 |
| Oil extended solution (poly(styrene-co-butadiene) | 27.5 | 27.5 |
| Poly(butadiene) | 10.0 | 10.0 |

TABLE VIII-continued

|  | Stock 7 | Stock 8 |
|---|---|---|
| Carbon Black | 33.3 | 33.3 |
| Precipitated silica | 33.0 | 33.0 |
| Wax | 1.0 | 1.0 |
| Antioxidant [N-(1,3 dimethylbutyl)-N'-phenyl-p-phenylene-diamine | 0.95 | 0.95 |
| Sulfur | 2.7 | 2.7 |
| Accelerator [N-Cyclohexyl-2-benzothiazolsulfenamine] | 0.5 | 0.5 |
| Zinc oxide | 1.5 | 1.5 |
| Diphenyl Guanidine | 0.5 | 0.5 |
| Dioctyl phthalate | 6.0 | 6.0 |
| Aromatic processing oil | 5.0 | 5.0 |
| N-octyl triethoxy silane | 1.8 | 1.8 |
| Sorbitan Monooleate | 5.0 | 5.0 |
| Si69 | 0.28 | 0.28 |

The solution SBR was obtained by polymerizing 1,3-butadiene monomer and styrene monomer in hexane solvent with an alkyllithium initiator. The living polymers were then coupled with tin tetrachloride. The resulting polymers had a Mooney Viscosity ($ML_{1+4}$ at 100° C.) of about 50, a vinyl content of about 58%, and a styrene content of about 20%. The oil extended solution poly(styrene-co-butadiene) was similarly prepared and extended in oil. The poly(metal carboxylate) grafted rubber was prepared by grafting zinc methacrylate to a poly(butadiene) polymer that was obtained under the tradename DIENE 55™ (Firestone Synthetic Polymers; Akron, Ohio) by using an AIBN initiator. The resulting grafted rubber had about 33% by weight poly(zinc methacrylate) graphs.

Figure 2:
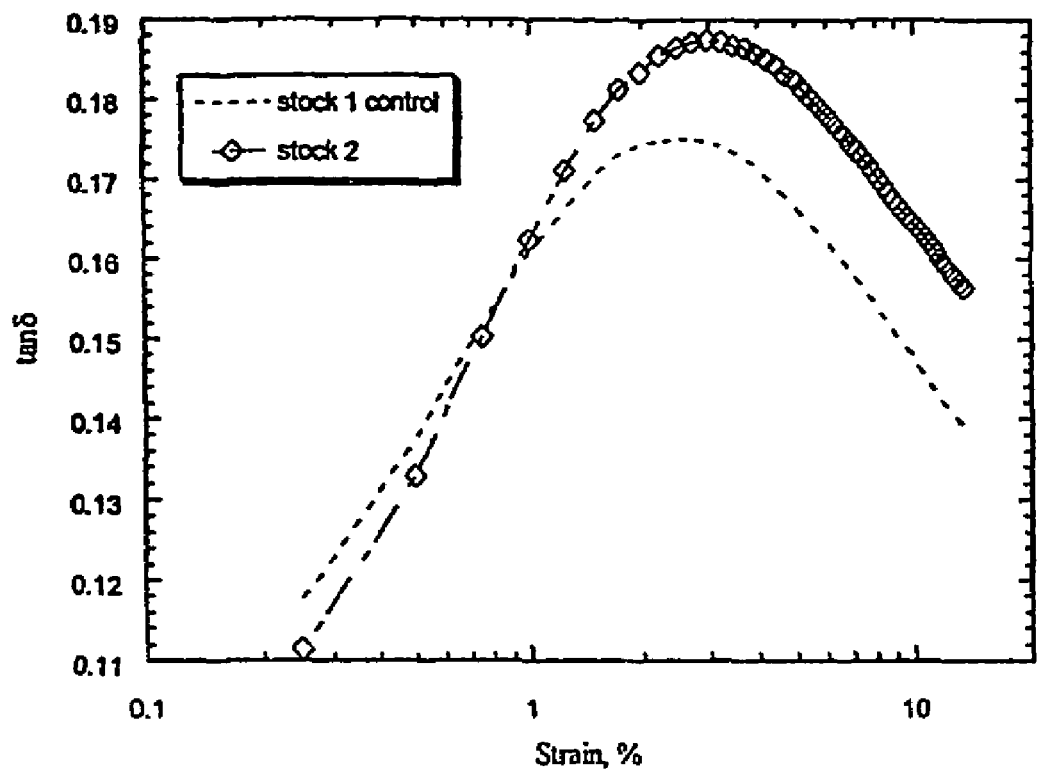
FIG. 2 is a graphical plot of the strain dependence of tan $\delta$ of a vulcanizate prepared according to the present invention as compared to a control.

The final compounds were sheeted and cured. Test specimens for dynamic storage moduli experiments were formed. The dynamic storage moduli were measured by temperature sweep experiments. These measurements were conducted with a frequency of 31.4 rad/sec by using 0.5 percent strain for temperatures ranging from −100° C. to −10° C., and 2 percent strain for the temperature ranging from −10° C. to 100° C. A frequency of 3.14 rad/sec was used for strain sweep, which was conducted at 65° C. with strain sweeping from 0.25 percent to 14.75 percent. The temperature dependence of the G' of stocks 1 and 2 are shown in FIG. 1. The vulcanizates of stocks 7 and 8 were also subjected to strain sweep experiments. These experiments were conducted at a frequency of 3.14 rad/sec was used for strain sweep, which was conducted at 65° C. with strain sweeping from 0.25 percent to 14.75 percent. From this data, tan δ was calculated and plotted over the strain sweep as shown in FIG. 2.

The vulcanizates were then tested for tensile properties according to ASTM D 412 at 25° C. The tensile test specimens were round rings with a diameter of 0.127 cm and a thickness of 0.191 cm. A specific gauge length of 2.54 cm was used. Table III provides the results of the tests.

The vulcanizates of stocks 7 and 8 were also evaluated for wear resistance by the Lambourne test. Samples of this test were circular donuts with the following approximate dimensions: 22.86 mm inner diameter and 48.26 mm outer diameter, and 4.95 mm thick. Test specimens were placed on an axle and run at a slip ratio of 25% against a driven abrasive surface. The wear indices were obtained from the ratio of the weight loss of the control to that of the tested sample. Samples with higher wear indices have better wear resistance properties. Table IX provides the results of these tests.

TABLE IX

|  | Stock 7 | Stock 8 |
|---|---|---|
| 50% Modulus (MPa) | 1.39 | 1.30 |
| 300% Modulus (MPa) | 10.36 | 9.302 |
| Tensile at Break (MPa) | 16.27 | 18.14 |
| Elongation at break (%) | 419 | 485 |
| Toughness (MPa) | 29.60 | 39.96 |
| Lambourne Weight loss (g) | 0.1108 | 0.0808 |
| Lambourne Wear Index | 100 | 127 |

Stocks 9-11

Three tire stocks were prepared from the formulations in Table X by using the compounding protocol set forth in Table II within a 310 g Brabender mixer set at 60 rpm.

TABLE X

|  | Stock 9 | Stock 10 | Stock 11 |
|---|---|---|---|
| Natural Rubber | 20.0 | 20.0 | 20.0 |
| Solution SBR with modified chain ends | 50.0 | 50.0 | 50.0 |
| Poly(metal carboxylate) grafted rubber | 0.0 | 5.0 | 5.0 |
| Oil extended solution (poly(styrene-co-butadiene) | 27.5 | 27.5 | 27.5 |
| Poly(butadiene) | 10.0 | 10.0 | 10.0 |
| Carbon Black (SAF) | 33.3 | 33.3 | 66.4 |
| Precipitated silica | 33.0 | 33.0 | 0 |
| Wax | 1.0 | 1.0 | 1.0 |
| Antioxidant [N-(1,3 dimethylbutyl)-N'-phenyl-p-phenylene-diamine | 0.95 | 0.95 | .95 |
| Sulfur | 2.7 | 2.7 | 2.7 |
| Accelerator [N-Cyclohexyl-2-benzothiazolsulfenamine] | 0.5 | 0.5 | 0.5 |
| Zinc oxide | 1.5 | 1.5 | 1.5 |
| Diphenyl Guanidine | 0.5 | 0.5 | 0.5 |
| Dioctyl phthalate | 6.0 | 6.0 | 6.0 |
| Aromatic processing oil | 5.0 | 5.0 | 5.0 |
| Octyl triethyl silane | 1.8 | 1.8 | 1.8 |
| Sorbitan Monooleate | 5.0 | 5.0 | 5.0 |
| Si69 | 0.28 | 0.28 | 0.28 |

The ingredients set forth in Table X were essentially the same as the ingredients set forth in Table VIII.

TABLE XI

| Master Batch Stage 1 | |
|---|---|
| Initial Temperature | 100° C. |
| 0 sec | charging polymers |
| 30 sec | charging carbon black, silica, shielding agent or Silanes (if added) and all pigments. |
| 5 min. | drop |
| Drop temperature | 175-180° C. |
| Master Batch Stage 2 | |
| Initial Temperature | 70° C. |
| 0 sec | charging remilled stock |
| 30 sec | charging Si69 (if added) and remaining silica. |
| Drop Temperature | 155° C. |

Figure 3:
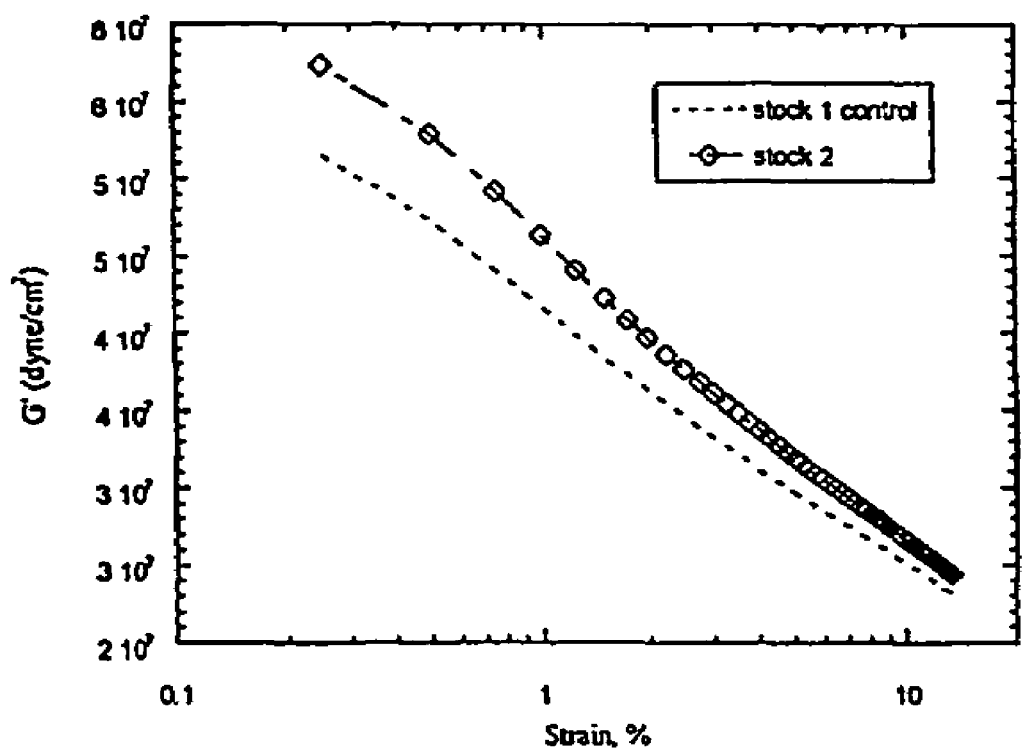
FIG. 3 is a graphical plot of the strain dependence of $G'$ of a vulcanizate according to the present invention as compared to controls, where one control employs carbon black as a filler.

Test specimens for dynamic storage moduli experiments were prepared in a similar fashion to those prepared for Stocks 7 and 8, and they were likewise analyzed in a similar fashion. The temperature dependence of G' for Stocks 9-11 is shown in FIG. 3.

Various modifications and alterations that do not depart from the scope and spirit of this invention will become apparent to those skilled in the art. This invention is not to be duly limited to the illustrative embodiments set forth herein.

What is claimed is:

1. A tire component including a tire tread that comprises:
   a vulcanized rubber; and
   an inorganic filler selected from the group consisting of silica, aluminum hydroxide, and both silica and aluminum hydroxide;
   where the vulcanized rubber includes the vulcanization product of from about 0.2 to about 10 parts by weight, per 100 parts by weight rubber, of a modified rubber selected from the group consisting of: (i) an unsaturated polymer including pendant groups deriving from a grafting reaction where a metal salt of an unsaturated carboxylic acid is grafted to the backbone of the polymer, and (ii) an unsaturated polymer including pendant or terminal groups containing carboxylic acid or anhydride groups, where the unsaturated polymer is selected from the group consisting of poly(butadiene), poly(styrene-co-butadiene), poly(isoprene), poly(styrene-co-butadiene-co-isoprene), poly(styrene-co-isoprene), and terpolymers of ethylene, and $\alpha$-olefin, and diene monomer.

2. The tire component of claim 1, further comprising a modified polyolefin that includes pendent or terminal functional groups containing carboxylic acid or anhydride groups.

3. The tire component of claim 2, wherein the tire component is devoid of zinc oxide.

4. The tire component of claim 3, where the modified rubber includes an unsaturated polymer including pendant groups deriving from a grafting reaction where a metal salt of an unsaturated carboxylic acid is grafted to the backbone of the polymer.

5. The tire component of claim 4, where the polymerized metal salt of an unsaturated carboxylic acid derives from an $\alpha,\beta$-ethylenically unsaturated carboxylic acid salt having from 3 to 8 carbon atoms.

6. The tire component of claim 5, where the unsaturated carboxylic acid salt contains sodium, potassium, magnesium, calcium, zinc, barium, aluminum, tin, zirconium, lithium, or cadmium.

7. The tire component of claim 6, where the modified rubber is a macromolecule comprising an unsaturated hydrocarbon rubber backbone having pendently grafted thereto a polymerized metal salt of an unsaturated carboxylic acid.

8. The tire component of claim 7, where the unsaturated rubber backbone is a homopolymer of a conjugated diene, a copolymer of a conjugated diene and a vinyl aromatic monomer, or a terpolymer of ethylene, propylene, and a diene.

9. The tire component of claim 4, where the tire is devoid of particulate nylon.

10. The tire component of claim 4, where the poly(metal carboxylate) graft rubber is prepared by i) dissolving an unsaturated hydrocarbon rubber in a solvent ii) adding to the dissolved rubber a metal salt of an unsaturated carboxylic acid to form a rubber/carboxylic acid blend, iii) adding to the rubber/carboxylic acid blend a free radical initiator, and iv) hearing the reaction mixture to a temperature of from about 40 to about 150° C. for about 0.1 to about 100 hours.

11. The tire component of claim 4, where the modified rubber includes from about 2 to about 35 percent by weight pendant groups deriving from the grafting reaction with metal salts of an unsaturated carboxylic acid.

12. The tire component of claim 4, where the modified rubber includes from about 3 to about 25 percent by weight pendant groups deriving from the grafting reaction with metal salts of an unsaturated carboxylic acid.

13. The tire component of claim 4, where the tread includes from about 0.1 to about 25 parts by weight per 100 parts by weight rubber of the modified rubber.

14. The tire component of claim 4, where the tread includes from about 0.2 to about 20 parts by weight per 100 parts by weight rubber of the modified rubber.

15. The tire component of claim 4, where the tread includes from about 0.5 to about 15 pans by weight per 100 parts by weight rubber of the modified rubber.

16. The tire component of claim 1, wherein the modified rubber is vulcanized.

17. The tire component of claim 1, where the rubber composition further comprises carbon black.

18. The tire component of claim 1, where the modified rubber includes functional groups deriving from citraconic acid, cinnamic acid, methacrylic acid, itaconic acid, or mixtures thereof, and maleic anhydride, citraconic anhydride, itaconic anhydride, or mixtures thereof.

19. The tire component of claim 1, where the rubber composition further comprises a coupling agent, a dispersing agent or both.

20. The tire component of claim 18, where the modified rubber contains from about 0.02 to about 28 milliequivalents of functional groups per gram of modified polymer.

21. A tire tread comprising:
   a vulcanized rubber; and
   from about 10 to about 100 parts by weight inorganic filler per 100 parts by weight rubber, where the inorganic filler is selected from the group consisting of silica, aluminum hydroxide, and both silica and aluminum hydroxide;
   where the vulcanized rubber includes the vulcanization product of from about 0.2 to about 10 parts by weight of modified rubber per 100 parts by weight rubber; and
   wherein said modified rubber is selected from the group consisting of (i) an unsaturated polymer including pendant groups deriving from a grafting reaction where a metal salt of an unsaturated carboxylic acid is grafted to the backbone of the polymer, and (ii) an unsaturated polymer including pendent or terminal functional groups containing carboxylic acid or anhydride groups, where the unsaturated polymer is selected from the group consisting of poly(butadiene), poly(styrene-co-butadiene), poly(isoprene), poly(styrene-co-butadiene-co-isoprene), poly(styrene-co-isoprene) and terpolymers of ethylene, and $\alpha$-olefin, and diene monomer, where the vulcanized rubber is a tire tread.

22. A tire prepared by a process comprising the steps of:
   vulcanizing a rubber composition that has been prepared by compounding ingredients comprising:
   a rubber;
   an inorganic filler, where the inorganic filler is selected from the group consisting of silica aluminum hydroxide, and both silica and aluminum hydroxide;
   from about 0.2 to about 10 parts by weight per 100 parts by weight rubber, of a modified rubber selected from the group consisting of: (i) an unsaturated polymer including pendant groups deriving from a grafting reaction where a metal salt of an unsaturated carboxylic acid is grafted to the backbone of the polymer, and (ii) an unsaturated polymer including pendant or terminal groups containing carboxylic acid or anhydride groups, where the unsaturated polymer is selected from the group consisting of poly(butadiene), poly(styrene-co-butadiene), poly(isoprene), poly(styrene-co-butadieneco-isoprene), poly(styrene-co-isoprene), and terpolymers of ethylene, and α-olefin, and diene monomer; and optionally a modified polyolefin that contains pendent or terminal functional groups containing carboxylic acid or anhydride groups, where the rubber composition is in the shape of a tire tread and said step of vulcanizing produces a tire with a tread from the rubber composition.

23. The tire of claim 22, where the rubber composition comprises from about 1 to about 100 parts by weight inorganic filler phr, from about 0.1 to about 25 parts by weight modified rubber phr, and from about 0.1 to about 25 parts by weight of the modified polyolefin phr.

24. The tire of claim 22, where the modified rubber includes an unsaturated polymer including pendant groups deriving from a grafting reaction where a metal salt of an unsaturated carboxylic acid is grafted to the backbone of the polymer.

25. The tire of claim 24, where the modified rubber includes from about 2 to about 35 percent by weight pendant groups deriving from the grafting reaction with metal salts of an unsaturated carboxylic acid.

26. The tire of claim 24, where the modified rubber includes from about 3 to about 25 percent by weight pendant groups deriving from the grafting reaction with metal salts of an unsaturated carboxylic acid.

27. The tire of claim 24, where the rubber composition includes from about 0.1 to about 25 parts by weight per 100 parts by weight rubber of the modified rubber.

28. The tire of claim 24, where the rubber composition includes from about 0.2 to about 20 parts by weight per 100 parts by weight rubber of the modified rubber.

29. The tire of claim 24, where the rubber composition includes from about 0.5 to about 15 parts by weight per 100 parts by weight rubber of the modified rubber.

* * * * *